Patented July 7, 1936

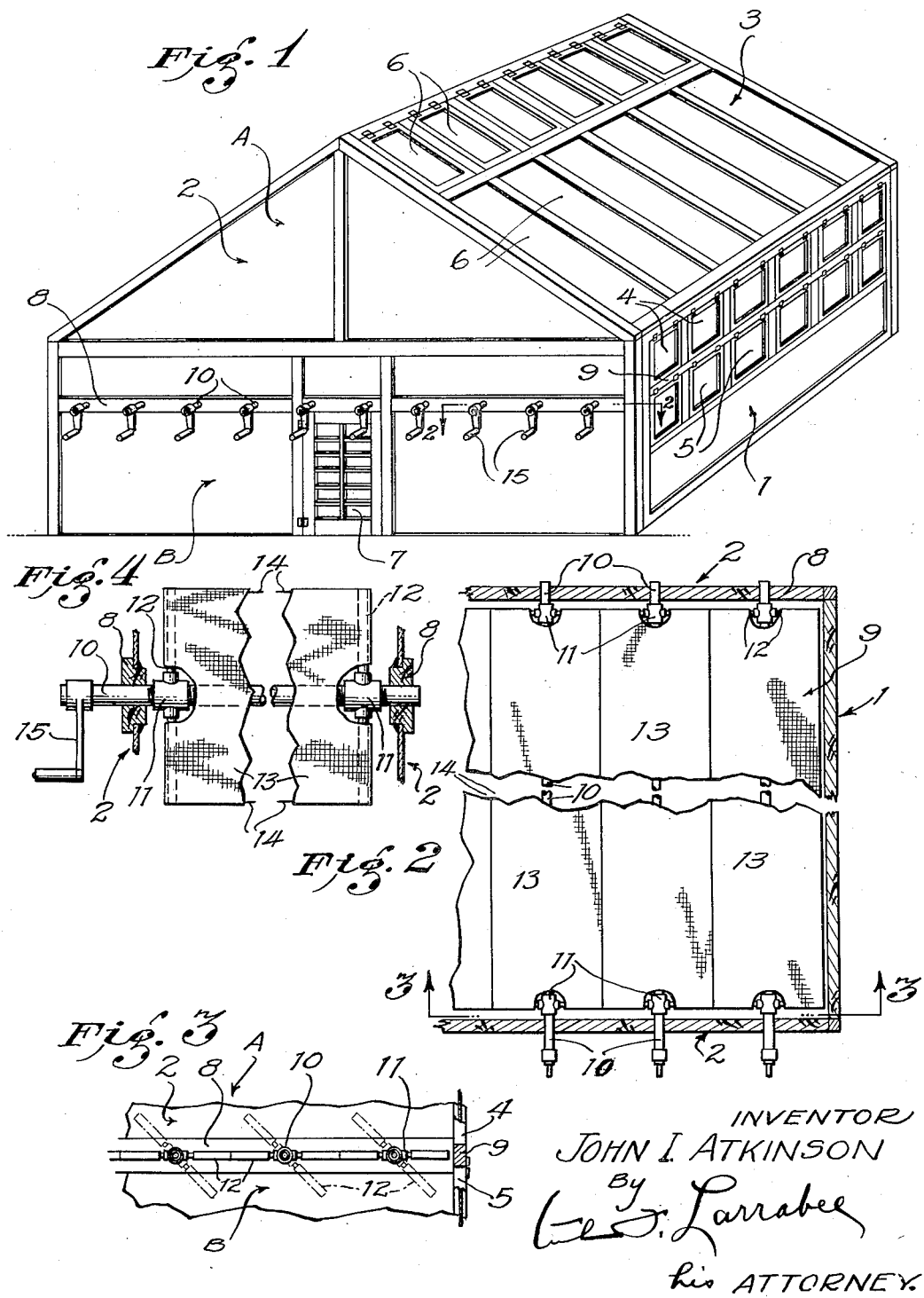

2,046,601

UNITED STATES PATENT OFFICE 2,046,601

HOTHOUSE

John I. Atkinson, San Gabriel, Calif.

Application January 24, 1936, Serial No. 60,677

12 Claims. (Cl. 47—17)

My invention relates to hot houses or other plant propagation houses that are made of glass or other transparent or translucent material so that light and heat from the sun may penetrate to the interior of the house; and more particularly is an improvement over the invention disclosed in my co-pending application filed March 8, 1935, Serial No. 10,006.

In my co-pending application such means are provided for regulating and controlling the humidity and temperature in the hot house particularly by providing a transparent or translucent and varied partition that divides the hot house into upper and lower zones and which partition extends substantially from end to end and side to side of the hot house whereby regulation of ventilator panels in the roof, sides, and partition of the hot house permits heat and humidity transfer and equalization in said upper and lower zones.

The present invention adds to the advantages of the foregoing arrangement by providing in particular a novelly arranged partition which not only divides the hot house into upper and lower zones in order to effect heat and humidity control but also provides a simple and efficient means of regulating and controlling the intensity and character of the light and/or heat rays admitted to the lower zone of the hot house.

An object of my invention is to provide a novel means whereby direct, indirect, or reflected light rays may be admitted to plants in the lower zone of the hot house.

Another object is to provide a novel means whereby the amount of light rays or the amount of heat rays from the sun admitted to the lower zone of the hot house may be varied according to light conditions presented on cloudy or bright days.

Another object is to provide a novel ceiling for hot houses whereby the light rays admitted to the plant growing compartment of the hot house may be easily and quickly controlled and regulated to provide a regulated light to the growing compartment of the hot house dependent upon the character of plants in said growing compartment.

A further object of my invention is to provide a novel ventilation on said control for hot houses whereby the amount of light admitted to plants in the growing compartment of the hot house may be ventilated regardless of time of day, the brightness of the day or the time of the season.

A still further object is to provide a novel means incorporating the above advantages and features and which may be readily incorporated in conventional hot houses now in use whereby the light rays admitted to the growing compartment of the hot house may be easily and quickly regulated.

Other objects, advantages, and features of invention may appear from the accompanying drawing, the subjoined detail description and the appended claims.

The accompanying drawing illustrates one form of my invention in more or less diagrammatic or illustrative manner and in which:

Figure 1 is a perspective and substantially diagrammatical view of a hot house embodying my invention.

Fig. 2 is a fragmentary horizontal sectional view taken substantially on a plane indicated by line 2—2, Fig. 1, showing the vanes or closures of the regulating means in elevation and in closed position. Parts have been broken away to contract the view.

Fig. 3 is a fragmentary sectional view taken on line 3—3, Fig. 2, showing the regulating means in end elevation. Full lines indicate the closed position of said closure members and dot-and-dash lines indicate an open position of said closure members.

Fig. 4 is an enlarged fragmentary elevational view of a single vane or closure member with adjacent supporting portions of the hot house being shown fragmentarily and in section.

My hot house comprises side walls 1, end walls 2 and a roof 3, the latter preferably in the form of a single gable. Along the side walls 1 there is provided an upper and a lower row of panels 4 and 5 respectively which are preferably hinged and preferably translucent or transparent.

Along either side of the ridge of the roof are provided rows of other panels 6 which are likewise hinged and also preferably translucent or transparent. The various panels are constructed from glass, "cellophane" or other suitable transparent or translucent material.

At one or both ends and otherwise positioned in the walls of the house, if desired, are doors 7. Along two opposite walls, in this case the end walls 1, there is provided a pair of horizontal reinforcing supports or bars 8 preferably at the same height as the partition, designated 9, which separates the upper and lower rows of panels 4 and 5.

At suitably spaced intervals, shafts 10 extend between and are preferably journaled in the bars 8. The shafts 10 are preferably lengths of pipe and may be provided adjacent each end with transverse or oppositely extending pipe fittings 11 each of which supports a pair of laterally extending rods 12. Between the rods 12 and along each corresponding shaft 10 is stretched a vane 13. The vanes or closures 13 may be formed of cloth, such as muslin or other material such as "cellophane" or "celluloid" or may be more elaborate and formed of glass. Also the vanes 13 may be painted or treated with various substances to give them the desired degree of translucence or opaqueness. In addition to the support afforded by shafts 10, wires 14 may be extended along the margins of the vanes and secured to the end rods 12. While the vanes are shown as abutting each other, it is of course obvious that they may overlap, and further that the shafts 10 may be positioned off-center with respect to the vanes.

The several vanes 13 when closed divide the hot house into an upper zone A and a lower zone B.

One or both ends of the shaft 10 may be provided with suitable tilting or oscillating means, in this case I have shown, as for example, individual crank members 15. However, it is obvious that all or groups of the vanes may be operated in unison by any conventional connecting means such as levers and connecting bars, sprockets and chains, pulleys and cable, or other instrumentalities and be entirely within the scope of my invention.

The hot house herein disclosed may be utilized in various ways. For example, the panels 5 and 6 may be opened and the vanes as well as the panels 4 may be closed during the heat of the day to entrap warm air in the upper zone A, and conserve the humidity in the lower zone B. At night or in the afternoon, the panels 5 and 6 may be closed and the vanes 13 opened to allow the humid air of compartment B to mix with the warmer, dry air of compartment A, thereby lowering the humidity and counteracting the tendency of the humidity to raise as the hot house cools during the night.

While the foregoing function may be accomplished by the vanes 13 in association with the various panels, the vanes are primarily intended to perform another important function; namely, that of regulating and controlling the amount of sunlight or light or heat rays admitted to the plants in the lower zone or plant growing compartment B. On dull days, the vanes may be opened as widely as possible to admit the maximum light, directly into the lower zone B. On brighter days the vanes may be positioned to prevent the bright light rays from entering the lower zone to thereby minimize any detrimental effect of direct sunlight on the plants yet insuring a uniform and adequate supply of light rays for growing purposes. Furthermore, the vanes may be quickly changed and adjusted to meet sudden weather changes or to regulate the supply of light to the growing compartment B depending on the character of sunlight during any particular day or time of day.

From the foregoing it will be seen that I have provided a transparent or translucent ceiling for a hot house that extends substantially from end to end and side to side of said hot house and which ceiling is made up of a plurality of adjustable vanes that may be controlled to admit to the plant growing compartment B of said hot house a regulated amount of light rays to provide a maximum controlled light for the plants being propagated in the compartment B. As for example, on bright days the vanes may be tilted to prevent direct sun rays from entering the zone B, but still indirect light rays are permitted to enter zone B to supply sufficient light for growing purposes, thereby preventing direct sun rays from burning the plants and enabling maximum growth of the plants being propagated.

In the event the vanes 13 are made from muslin, Cellophane or glass the same may be coated, as for example, with whitewash so that they may be either transparent or translucent to an opaque for permeability of light rays; and if muslin is used the same may be easily and quickly changed from the vane frame to another of a differing density to thereby permit regulation of light rays at any time of the year; as for example, in the bright summer the vanes may be more dense and in the winter the vanes may be more transparent.

It will thus be seen that plants in zone B may be shaded from direct sun rays and still obtain sufficient light for growing purposes and also by my novel ceiling I am enabled to obtain proper ventilation for the growing plants.

I claim:

1. The combination with a hot house, of a plurality of light deflecting and directing elements interposed between the floor and roof of the hot house.

2. In a hot house, a plurality of transparent or translucent light deflecting elements together defining a horizontal partition between the floor and roof of said hot house and extending substantially from end to end and side to side of said hot house.

3. In a hot house, a plurality of tiltable vanes arranged side by side and adapted to occupy horizontal positions wherein said vanes together define a partition dividing the hot house into upper and lower zones.

4. In a hot house, a lower ventilated compartment; an upper ventilated compartment; and a partition between and separating said compartments, said partition comprising a plurality of tiltable light and heat deflecting vanes arranged side by side.

5. In a hot house, a lower ventilated zone, an upper zone; and a combined ventilating and light admitting partition incorporating means for varying and controlling the amount of light admitted through the upper zone to the lower zone.

6. A hot house comprising walls, a roof thereover, and a plurality of closures extending from one side to the other side of said hot house and, when closed, dividing the same into upper and lower zones.

7. A hot house having interposed therein plurality of closures forming, when closed, a transparent or translucent ceiling extending substantially from side to side and end to end of the hot house.

8. A hot house having interposed therein a plurality of closures forming, when closed, a transparent or translucent ceiling extending substantially from side to side and end to end of the hot house, and means for opening and closing the several closures.

9. The combination with a hot house, of a plurality of light deflecting and directing elements interposed between the floor and roof of the hot house, and means for tilting said elements.

10. In a hot house, a plurality of shafts arranged in parallel relation; a strip of material, at least semi-permeable to light extended along and supported by each shaft to form a light controlling vane; and means for turning said shafts to vary the angular positions of said vanes.

11. In a hot house, a plurality of shafts arranged in parallel relation; a strip of material, at least semi-permeable to light extended along and supported by each shaft to form a light controlling vane; means for turning said shafts to vary the angular positions of said vanes, and said vanes adapted to extend into substantially contiguous relation with each other when horizontal, to define a ceiling interposed between the roof and floor of the hot house for dividing the hot house into upper and lower zones.

12. In a hot house, a plurality of shafts arranged in substantially parallel relation; a strip of material, at least semi-permeable to light extended along and supported by each shaft to form a light controlling vane; and means for turning said shafts to vary the angular positions of said vanes, said vanes adapted to extend into substantially contiguous relation with each other when horizontal to define a ceiling interposed between the roof and floor of the hot house for dividing the hot house into upper and lower zones.

JOHN I. ATKINSON.